Dec. 1, 1964   O. HARKE   3,159,181
MIXING VALVE FOR SPHERICAL VALVE ELEMENT
AND WITH INSTANT REPEAT SETTING
Filed Aug. 21, 1961   3 Sheets-Sheet 1
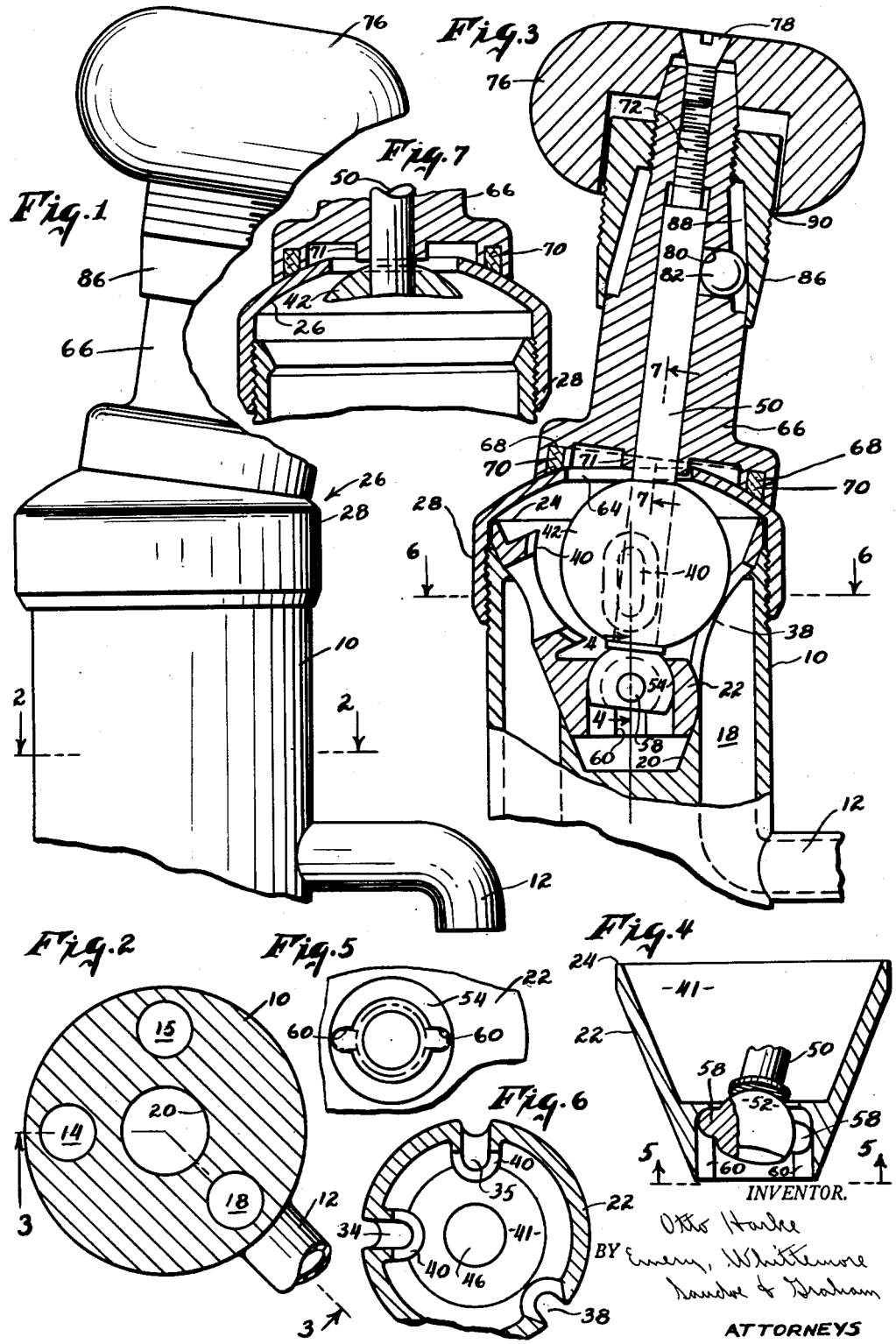
INVENTOR.
Otto Harke
BY Emery, Whittemore
Sandoe & Graham
ATTORNEYS

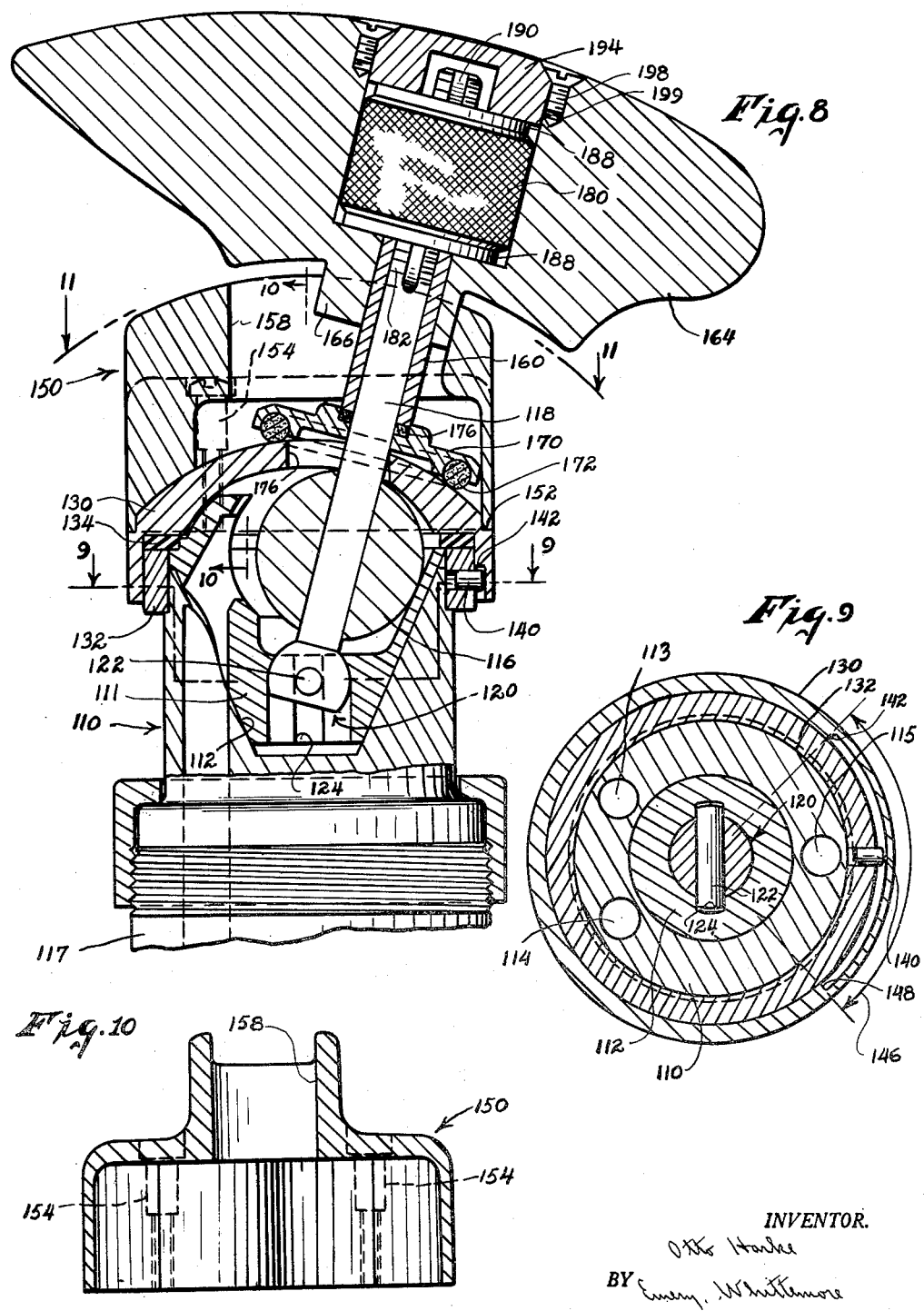

Dec. 1, 1964 O. HARKE 3,159,181
MIXING VALVE FOR SPHERICAL VALVE ELEMENT
AND WITH INSTANT REPEAT SETTING
Filed Aug. 21, 1961 3 Sheets-Sheet 3
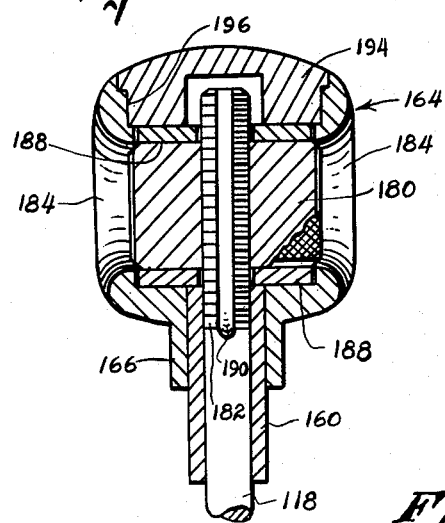
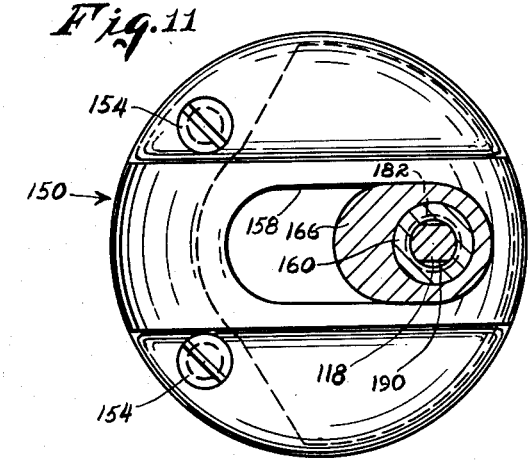
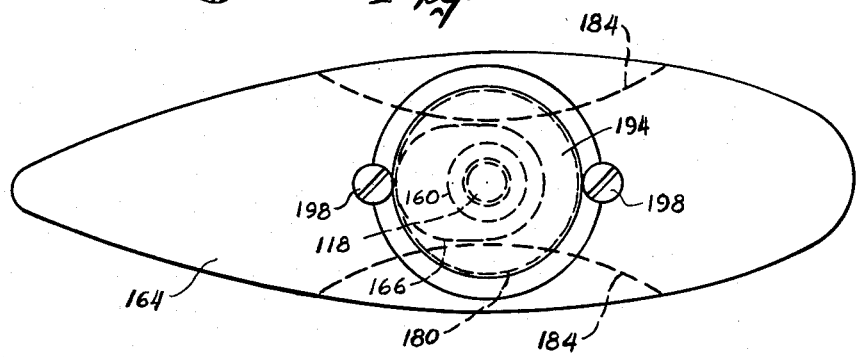
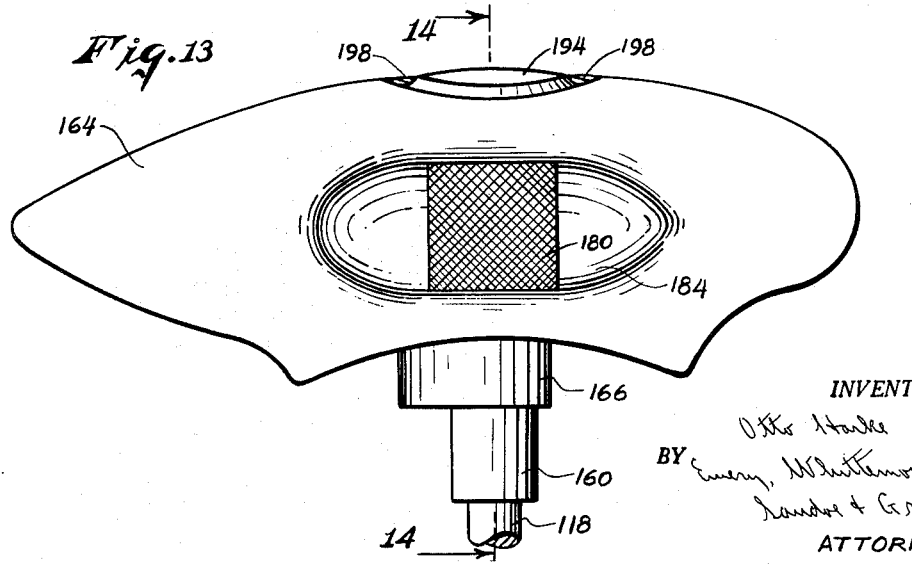
INVENTOR.
Otto Harke
BY Emery, Whittemore
Sandoe & Graham
ATTORNEYS

United States Patent Office 3,159,181
Patented Dec. 1, 1964

3,159,181
MIXING VALVE FOR SPHERICAL VALVE ELEMENT AND WITH INSTANT REPEAT SETTING
Otto Harke, 50—28 64th St., Woodside, N.Y.
Filed Aug. 21, 1961, Ser. No. 132,850
25 Claims. (Cl. 137—625.4)

This invention relates to valves for controlling the flow of water and the mixing of hot and cold water to control the temperature of a stream discharged from a faucet.

It is an object of the invention to provide a simplified and less expensive mixing valve for hot and cold water. It is another object to provide a valve of the character indicated with manual operating mechanism which is convenient to use and in which the ratio of hot and cold water is conveniently obtained by moving a handle with universal motion over a spherical surface.

Another object of the invention is to provide a mixing valve having a handle movable selectively along different co-ordinates and combinations of co-ordinates and with rugged and reliable means for preventing leakage of liquid around the connection of the handle with the interior of a valve housing.

In accordance with one feature of the invention, there are means for obtaining an instant repeat setting of the valve so that the mixture ratio found satisfactory, when the valve was last used, can be repeated without experimentation.

Other objects, features and advantages of the invention will appear or be pointed out as the description proceeds.

In the drawing, forming a part hereof, in which like reference characters indicate corresponding parts in all the views:

FIGURE 1 is a side elevation of a mixing valve made in accordance with this invention;

FIGURE 2 is a sectional view taken on the line 2—2 of FIGURE 1;

FIGURE 3 is a vertical sectional view through the valve shown in FIGURE 1, the section being taken along the planes indicated by the line 3—3 of FIGURE 2;

FIGURE 4 is a fragmentary sectional view on the plane 4—4 of FIGURE 3;

FIGURE 5 is a fragmentary bottom view of the structure shown in FIGURE 4;

FIGURE 6 is a fragmentary sectional view on the plane 6—6 of FIGURE 3, with the valve element removed;

FIGURE 7 is a fragmentary sectional view on the line 7—7 of FIGURE 3;

FIGURE 8 is a vertical elevation similar to FIGURE 3, but showing a modified form of the invention;

FIGURE 9 is a sectional view taken on the line 9—9 of FIGURE 8;

FIGURE 10 is a sectional view through the cover, on the line 10—10 of FIGURE 8, with the cover removed from the valve assembly;

FIGURE 11 is a sectional view taken on the arc 11—11 of FIGURE 8;

FIGURE 12 is a top plan view of the operating handle for the valve assembly shown in FIGURE 8;

FIGURE 13 is a side elevation of the operating handle illustrated in FIGURE 12; and FIGURE 14 is a sectional view taken on the line 14—14 of FIGURE 13.

The valve illustrated in the drawing includes a housing 10 having a discharge outlet 12 and having inlet passages 14 and 15 for receiving hot and cold water, respectively. These passages 14 and 15 extend upwardly in the housing 10. There is a discharge passage 18 leading downwardly through the housing 10 to the discharge outlet 12.

All of the passages 14, 15 and 18 communicate with a frusto-conical recess 20 at the upper end of the housing 10. An insert 22 fits into the recess 20 and is preferably a lap fit in the recess. This insert 22 does not extend to the bottom of the recess 20, but it does have an upper edge 24 which extends above the upper end of the housing 10.

A cap 26 has a skirt portion 28 with inside threads that screw over complementary threads on the outside of the upper end of the housing 10. The cap 26 is screwed down on the housing 10 until the cap contacts with the insert 22; and the cap 26 is then tightened to press the insert 22 against the frusto-conical surface of the recess 20 with the desired force.

There are outlet openings 34, 35 and 38 extending through the insert 22 and in register with the passages 14, 15 and 18. The openings 34 and 35 have side walls that terminate in concave spherical faces 40.

Within a chamber 41 provided by a hollow interior of the insert 22, and extending upwardly into the cap 26, there is a ball 42 having substantially the same radius of curvature as the end faces 40. When the ball 42 is brought into contact with both of the end faces 40 at the same time, no water can flow into the chamber 41 from the passages 14 and 15.

When the ball 42 is moved away from the openings 34 and 35, along a center line 46 (FIGURE 6), equal quantities of water can flow from the openings 34 and 35 and through the chamber 41 to the outlet opening 38. This result assumes equal pressure behind the water supplied to the passages 14 and 15 which communicate with the openings 34 and 35, respectively.

Instead of moving away from the openings 34 and 35 along the center line 46, the ball 42 may move toward one side or the other of the center line 46. If the ball 42 is below the center line 46, as viewed in FIGURE 6, and closer to the opening 34 than to the opening 35, then the ball obstructs flow from the opening 34 more than it obstructs flow from the opening 35 and this changes the ratio of water flowing from the passages 14 and 15 and through the chamber 41. It will be evident that the ball 42 may remain in contact with the end face 40 of either of the openings 34 and 35 and yet move away from the other opening 35 or 34 as the result of the elastic surface of the ball rocking about the narrow ridge face 40 with which the ball remains in contact.

The ball 42 is rotatable and axially movable on a stem 50 so as to give the ball rolling friction on the faces 40 and to make it self-aligning. The areas of the elastic surface of the ball 42 that contact with the faces 40 are left to chance and haphazard turning of the ball causes different areas to contact at different times, with resulting equalization of wear. The stem 50 has a compound ball-and-socket bearing at its lower end. This ball-and-socket bearing includes a spherical surface 52 attached to the lower end portion of the stem 50 and with a radius of curvature corresponding to a concave spherical bearing 54 forming sides of an opening through the lower end of the insert 22.

In a plane at right angles to the plane of section of FIGURE 3, the lower end portion of the stem 50 has projections 58 which strike against surfaces 60 to limit the transverse swinging movement of the stem 50, and to prevent the stem 50 from turning about its longitudinal axis.

The upper part of the stem 50 extends through an opening 64 in the cap 26. There is a filler piece 66 which fits over the upwardly projecting portion of the stem 50 above the cap 26. This filler piece 66 has an annular groove 68 that carries packing 70 that bears against the top surface of the cap 26 to prevent leakage of water from the chamber 41 and through the opening 64. A stop 71 on the filler piece 66 contacts with the sides of the opening 64 to limit movement and wear of the parts and to prevent the ball 42 from being forced against the faces 40 with excessive pressure.

The upper end of the filler piece 66 has a tapered outside surface, and there is a hand wheel 76 with a center tapered opening that fits over the tapered upper end of the filler piece 66. The hand wheel 76 is held in assembled relation with the piece 66 by a screw 78.

The piece 66 has an opening 80 for receiving a ball 82. This ball 82 is pressed into intimate clamping relation with the stem 50 by a sleeve 86 threaded over the upper end of the filler piece 66 and having a gradually tapered inside face 88 that bears against the ball 82. Although the wheel 76 extends downwardly beyond the upper end of the sleeve 86, there is a recess 90 in the hand wheel 76 providing clearance for the sleeve 86 to fit freely within the hand wheel 76.

The filler piece 66 is screwed down on the threads 72 as hard as necessary to press the packing 70 against the top surface of the cap 26 with the force necessary to prevent leakage of water from the chamber 41, through the opening 64 and then between the filler piece 66 and the top surface of the cap 26. This pressure is adjustable by screwing the filler piece 66 one way or another on the threads 72, and the adjustment can be locked by means of the ball 82 and sleeve 86. Since the valve stem 50 rocks about the same center as the center of curvature of the outside surface of the cap 26, the packing 70 can move across the top of the cap 26 without change in pressure of the packing against the top surface of the cap.

FIGURE 8 shows a modified form of the invention which includes a housing 110 with a frusto-conical insert 111 that fits into a complementary recess 112 in the housing. The insert 111 is bonded, fused or otherwise secured to the housing 110 after the lower end of the stem 118 has been inserted into the grooves 124. There are passages 113, 114 and 115 in the housing 110 for the flow of hot and cold water into the housing and the discharge of the mixed water from the housing. These passages open through a wall of the housing and register with corresponding passages in a connector block 117 of the piping system and to which the housing is connected by a construction similar to a conventional pipe union.

There is a ball valve element 116 carried by a stem 118 which swings with universal movement about a fulcrum at the lower end of the insert 111. This fulcrum includes a ball-and-socket connection 120 having projections 122 which extend into grooves 124, the construction being similar to that used in FIGURES 1, 3, 4 and 5, previously described.

There is a cap 130 at the upper end of the housing 110. This cap slips over a ring 132 which fits with a press fit over the upper end of the housing 110. The cap 130 is held down on the ring 132 in a manner which will be explained and it clamps a gasket 134 against the top surface of the ring to prevent leakage of fluid between the cap 130 and the ring 132.

A stud 140 projects from the ring 132 at one side of the housing. This stud 140 fits into the ring 132 with a press fit and projects into a cut-away lower corner or depression 142 formed in the inside surface of the ring 132. The height of the depression 142 is greater than the diameter of the stud 140 so that the cap 130 is free to move with respect to the stud 140. However, the depression 142 is of limited angular extent, as indicated by the dimension arrow 146. In the construction illustrated, the angular extent of the depression 142 is approximately 90°, plus an arc equal to the diameter of the stud 140 so as to permit 90° of angular movement of the cap 130 and a cover 150 connected to the cap. End faces 143 of the depression 142 strike against the stud 140 to limit the angular movement of the cap 130 and cover 150 with respect to the stud 140 and the ring 132 by which the stud is carried.

The cover 150 fits over the cap 130. The bottom edge of the cover 150 abuts against a shoulder 152 provided on the cap 130 for holding the cover 150 in a set relation with the cap 130. In the preferred construction, the outside surface of the cover 150 is flush with the cylindrical outside surface of the cap 130 so as to give the assembly a smoother and more ornamental contour.

The cover 150 is rigidly secured to the cap 130 by screws 154, the locations of which are shown in FIGURES 10 and 11. These screws 154 hold the cover 150 down against the shoulder 152 so that the cover 150 and cap 130 are an integral unit.

There is a slot 158 in the top of the cover 150. The stem 118 extends through this slot, but there is other structure carried by the stem 118 and surrounding the portion of the stem which extends through the slot 158. This other structure includes a sleeve 160 which fits over the stem 118 with a sliding fit. It also includes a handle 164 having a hub portion 166 that is of approximately the same width as the slot 158. This hub portion 166 slides back and forth in the slot 158 as a guide.

The hub portion 166 is elongated, as is best shown in FIGURE 11, so that it has flat sides in contact with the flat sides of the slot 158. Thus, rotation of the hub portion 166 causes a corresponding rotation of the cover 150 and of the cap 130 (FIGURE 8) which is rigidly secured to the cover. This rotation is, of course, limited in angular extent by the stud 140 which extends into the groove 142, as previously explained. So long as the cover 150 is left with the slot 158 in the same angular position, movement of the handle 164 along the slot 158 causes a similar mixture of hot and cold water each time the valve is operated, thus giving an instant repeat setting. The friction of the gasket 134 is higher than that of the sealing ring 172 and holds the cap 130 and its connected cover 150 against rotation except when an operator deliberately turns the handle 160 to change the mixture of hot and cold water.

There is a retainer 170 which fits around the stem 118 at the lower end of the sleeve 160. This retainer is slidable along the stem 118. A washer or O-ring 172 is carried by the retainer 170 and contacts with the top of the cap 130. This O-ring 172 is large enough to always span an opening 176 located in the top of the cap 130 and through which the stem 118 extends. Thus, for all positions of the stem 118, the O-ring 172 prevents leakage of fluid between the retainer 170 and the top surface of the cap 130.

The retainer 170 is held down, so as to maintain a pressure of the O-ring 172 against the top of the cap 130, and this same pressure holds the cap 130 on the ring 132 and compresses the gasket 134. This pressure is exerted against the top surface of the cap 130, by the sleeve 160 and there is a packing 176 at the lower end of the sleeve 160 for preventing leakage of fluid upwardly along the stem 118.

It is desirable to have an accurate control of the pressure between the O-ring or packing ring 172 and the top surface of the cap 130 because this pressure not only determines whether the valve assembly will leak but it also provides the friction for holding the stem 118 in any selected position. The friction should be sufficient to accomplish this holding function, but not substantially higher since any unnecessary increase in friction results in added effort to operate the valve.

The sleeve 160 is held down against the retainer 170 by a nut 180 that screws along threads 182 at the upper end of the stem 118. This construction is best shown in FIGURE 14.

The handle 164 has openings 184 at both sides in position to expose a portion of the circumference of the nut 180. Thus, it is possible to rotate the nut manually at all times to obtain any desired change in adjustment of the downward pressure of the sleeve 160.

There is a washer 188 at both ends of the nut 180.

These washers 188 may have some spring to them so as to exert pressure against the nut 180 to prevent it from turning too easily. A more important function of the washers 188 is the prevention of rotation of the nut 180 when the handle 164 is rotated. This result is obtained by having flats 190 on the stem 118, and by having washers formed with non-circular openings having sides that bear against the flats 190 so that the washers 188 can not turn with respect to the stem 118. Thus, rotation of the handle 164 can not turn either the washers 188 or the nut 180 with respect to the stem 118. The washers 188 are free, however, to slide axially along the stem 118 when the nut is rotated.

The lower washer 188 is pressed against the upper end of the sleeve 160 by the nut 180; and the upper washer 188 is pressed against the nut 180 by a plug 194 inserted into a bore 196 in the top of the handle 164. This plug 194 is held down against the upper washer 188 by screws 198 which thread into holes 199 in the top of the handle 164.

Although the modified construction shown in FIGURES 8–13 is different in many respects from that shown in FIGURES 1–7, and includes numerous advantages in manufacture and adjustment, the principle of operation is similar to that shown in FIGURES 1–7. The elongated shape of the handle 164 has an important advantage in that it permits the handle to be rotated much more easily than in the construction previously described and also makes it easier to determine by quick inspection, the setting of the handle.

The ring 172 and the gasket 134 are preferably made of different material so as to have different coefficients of friction. In the preferred construction, the ring 172 is made of leather and the gasket 134 is made of rubber.

The axes of the ball 116 and the stem 118 are preferably on the vertical center line of the ball-and-socket connection 120 when the ball is in closed position seated against the edges of the elongated openings through which water enters the valve chamber from the passages 113 and 114. The advantage of this feature is that turning of the valve handle 164 to rotate the cap 130 and to shift the slot 158 does not change the relative position of the ball 116 with respect to the different inlets when the ball is in closed position.

Whenever the valve handle 164 is in a position which does not locate the stem 118 on the vertical center line of the connection 120, it will be evident that turning of the valve handle 164 and the resulting angular movement of the slot 158 causes orbital movement of the handle 164, the stem 118 above the connection 120, and the ball 116. This changes the relative position of the ball with respect to the different openings through which water enters the valve chamber and thus changes the mixture of hot and cold water.

The passages through which water enters the valve chamber are transversely narrow and are elongated in a vertical direction. Their edge or lip portions are curved to substantially the curvature of the ball valve element 116. This makes it possible for them to co-operated with the ball valve element 116 when the ball valve element is rocked about the discharge inlet from one of the passages 113 or 114 without opening that passage, but for the purpose of moving the ball away from the other passage to obtain flow from the single passage without mixing. This operation requires that the ball valve element 116 have a certain compressibility; but even with compressibility of the ball valve element, the rocking movement would be ineffective with large-area water passages unless these passages were elongated in a direction transverse of the direction of movement of the ball as it is rocked.

The preferred embodiment of the invention has been illustrated and described, but changes and modifications can be made and some features can be used in different combinations without departing from the invention as defined in the claims.

What is claimed is:

1. A mixing valve including a housing enclosing a valve chamber, separate passages for hot and cold water opening through the housing and into the valve chamber, a conduit leading from the valve chamber and from the housing and serving as an outlet for liquid from said chamber, a valve element substantially smaller than the chamber and movable in the chamber toward and from the passages that open through the housing, the valve element having a spherical zone surface, a valve seat at the chamber end of each passage and extending into the chamber beyond the adjacent inside surface of the chamber for contact with the spherical surface of the valve element to seal the passage, a stem operably connected with the valve element, each valve seat being elongated in a direction extending generally parallel to the stem and having an arc of curvature in the direction of elongation, the valve seats being spaced from one another by a distance substantially less than 180° of extent of the chamber and the valve element being of a size and shape to contact with and seal both seats simultaneously, a bearing at one end of the stem and on which the stem oscillates toward and from both of said seats, the bearing being in position to space the center of oscillation at a distance from the center of curvature of the spherical zone surface of the valve element, and a handle on the other end of the stem.

2. A mixing valve including a housing enclosing a valve element, separate passages for hot and cold water opening through the housing and into the valve chamber, a conduit leading from the valve chamber and from the housing and serving as an outlet for liquid from said chamber, a valve element substantially smaller than the chamber and movable in the chamber toward and from the passages that open through the housing, the valve element having a spherical zone surface, a valve seat at the chamber end of each passage for contact with the spherical surface of the valve element to seal the passage, a stem operably connected with the valve element, the valve seats being spaced from one another by a distance substantially less than 180° of extent of the chamber so that the valve element can contact with both seats simultaneously, a bearing at one end of the stem and on which the stem oscillates toward and from both of said seats, the bearing being in position to space the center of oscillation at a distance from the center of curvature of the sperical zone surface of the valve element, and a handle on the other end of the stem.

3. The mixing valve described in claim 2 and in which the bearing in which the stem oscillates is a ball-and-socket bearing with a center of curvature located on a line that passes through the center of curvature of the spherical zone surface when said valve element is in the position occupied when sealing both passages.

4. The mixing valve described in claim 3 and in which there is a lug in the ball-and-socket bearing for preventing the rotation of the stem about its longitudinal axis.

5. The mixing valve described in claim 3 and in which the stem extends through the valve element and the valve element is slidable on the stem in the direction of the length of the stem to provide self-aligning of the valve element with each seat when moved into position to seal the passage associated with that seat, and there is a shoulder on the stem holding the valve element at the approximate position that centers the valve element in each seat as the stem is oscillated toward that seat.

6. The mixing valve described in claim 2 and in which each of the passages, where it enters the chamber, is an elongated slot with its long dimension substantially parallel to the axis of the spherical zone surface when the valve element is in contact with the seats, and the seats are elongated like the passages and each of the seats has curvature in at least a plane through said axis of the spherical zone surface and with the radius of curvature substantially equal to that of the spherical zone surface of the valve element.

7. The mixing valve described in claim 6 and in which the valve chamber is frusto-conical and becomes larger in cross section toward the upper end of the chamber.

8. The mixing valve described in claim 7 and in which the large end of the chamber is enclosed by a removable cap.

9. The mixing valve described in claim 8 and in which the valve chamber is in a hollow frusto-conical element that fits into a recess in an outer portion of the housing, and the cap holds the frusto-conical element in the outer portion of the housing, and there are removable fastening means holding the cap on the outer portion of the housing with the cap holding the frusto-conical element in said outer portion of the housing.

10. The mixing valve described in claim 1 and in which there is a cap closing the end of the chamber remote from the bearing, and the stem extends through an opening in the cap, which opening is of larger area than the cross section of the stem so as to permit oscillating movement of the stem, the surface of the cap being spherical with a center of curvature at the center of oscillating movement of the stem, and sealing means carried by the stem and surrounding the opening through the cap and contacting with the spherical surface of the cap.

11. The mixing valve described in claim 10 and in which the outside surface of the cap is a spherical surface, and the sealing means includes a soft portion that fits over the stem outside of the chamber, and there are adjustable means on the stem urging the sealing means against the outside of the cap.

12. The mixing valve described in claim 1 and in which the stem extends through the valve element, and the valve element is slidable on the stem in the direction of the length of the stem to provide self-aligning of the valve element with the seats when moved into position to seal a passage.

13. The mixing valve described in claim 1 and in which the valve element is a ball through which the stem passes, and the ball is rotatably mounted on the stem.

14. The mixing valve described in claim 13 and in which the portion of the stem that passes through the ball and the portions of the stem adjacent to the ball are bearings on which the ball is slidable axially on the stem whereby the ball is rotatably and floatably connected with the stem for self-aligning of the ball with the valve seats at the ends of said passages.

15. The mixing valve described in claim 14 and in which the stem has a bearing in the housing for preventing rotation of the stem about its longitudinal axis.

16. The mixing valve described in claim 1 and in which the valve element is a ball through which the stem passes, and the portion of the stem adjacent to the ball is a bearing on which the ball is movable axially along the stem to obtain a self-aligning of the ball with the valve seats at the ends of said passages.

17. The mixing valve described in claim 1 and in which there is a bearing at one end of the stem in which the stem has universal movement and the other end of the stem extends through an opening in the housing, which opening is large enough to permit the universal movement of the stem, but said opening having sides correlated with the valve seats in the chamber to stop further movement of the stem toward any seat before the compression of the valve element against that seat exceeds a preselected degree.

18. The mixing valve described in claim 1 and in which the valve element is a ball, and the stem extends through the ball along a diameter of the ball, the ball being rotatable with respect to the stem and the stem having universal movement in said bearing at one end of the stem so that the stem can impart orbital movement to the ball, and the seats are close together and the ball spans and contacts with both seats simultaneously and is deformable to remain in contact with one of the valve seats while it is rolled along an orbit into and out of sealing contact with the other valve seat whereby the ball may be rocked about one valve seat without opening the passage through that valve seat to move the ball away from the other valve seat and from the passage through said other valve seat to regulate flow from the passage through said other valve seat without mixing.

19. The mixing valve described in claim 1, characterized by a guide element having guide surfaces extending lengthwise along a course transverse of the length of the stem, the guide surfaces being adjacent to a part of the stem and in position to limit transverse movement of the stem to the direction of the lengthwise extent of the guide surfaces, a bearing by which the guide element is supported from the housing and on which the guide element is movable to change the direction of lengthwise extent of the guide surfaces transverse of the length of the stem, and means for holding the guide element in a selected position.

20. The mixing valve described in claim 19 and in which one end of the guide element is an abutment that stops transverse movement of the stem in the direction toward the valve seats, the position of the abutment being correlated with locations of the hot and cold water opening valve seats to limit the compression of the valve element against the sides of said openings when the stem is at the limit of travel toward said openings, and the bearing on which the guide element is movable having an axis equidistant from the hot and cold water openings.

21. The mixing valve described in claim 19 and in which the guide means is a cover on top of the housing, and the movement of the cover is rotation about an axis of the housing, and the guide is a slot in the cover extending transversely of the axis.

22. A mixing valve including a housing enclosing a valve chamber, separate passages for hot and cold water opening through the housing and into the valve chamber, a conduit leading from the valve chamber and from the housing and serving as an outlet for mixed hot and cold water from said chamber, a valve element within the housing movable toward and from the hot and cold water openings to control the flow of water from said openings, a stem, a bearing at one end of the stem and in which the stem has universal oscillating movement about a fixed axis of said bearing, the stem being operably connected with the valve element for moving the valve element into different positions with respect to the different openings to control the rate of flow and ratio of flow from the hot and cold water openings, a cap rotatably mounted on the housing over the valve chamber at a location remote from the bearing and where the stem has substantial transverse movement as it oscillates in said bearing and about the fixed axis of said bearing, the cap having an opening through which the stem extends and which is much larger in cross section than the stem to provide clearance for the substantial transverse movement, a retainer on the stem with packings that bear against the top surface of the cap over an annular area that is radially outward from the opening for all positions of the stem, a handle at the upper end of the stem, a pressure element above the retainer urging the retainer and packing toward the cap, and means on the handle movable in different directions to change the force of the pressure element against the retainer and packing and thereby to adjust the friction that resists movement of the stem.

23. The mixing valve described in claim 22 and in which the handle on the stem is elongated and the means on the handle are located within the handle and are partially exposed through openings in the sides of the handle so that said means can be operated manually by the fingers of a person moving the handle.

24. The mixing valve described in claim 22 and in which there is a gasket below the cap and a confronting surface on top, of the housing supporting the cap and in contact with the gasket for preventing leakage of water from the chamber between the cap and said confronting face, the same pressure element that urges the retainer and packing down on the cap also urging the cap and gasket down toward said confronting surface of the housing.

25. The mixing valve described in claim 24 and in which the packing and the gasket are made of different materials having different degrees of friction, the friction of the gasket being greater than that of the packing.

References Cited in the file of this patent

UNITED STATES PATENTS

| | | |
|---|---|---|
| 574,838 | Walsh | Jan. 5, 1897 |
| 2,262,062 | Strong | Jan. 11, 1941 |
| 2,503,881 | Manis | Apr. 11, 1950 |
| 2,535,580 | Kersten | Dec. 26, 1950 |
| 2,592,062 | Perry | Apr. 8, 1952 |
| 2,607,600 | Trautman | Aug. 19, 1952 |
| 2,679,864 | Harke | June 1, 1954 |
| 2,757,688 | Klingler | Aug. 7, 1956 |
| 2,839,085 | Harke | June 17, 1958 |
| 2,911,009 | Parker | Nov. 3, 1959 |
| 2,923,315 | Bletcher | Feb. 2, 1960 |

FOREIGN PATENTS

| | | |
|---|---|---|
| 624,406 | Germany | Jan. 20, 1936 |
| 861,058 | Great Britain | Feb. 15, 1961 |